US007545379B2

(12) United States Patent
Xie et al.

(10) Patent No.: US 7,545,379 B2
(45) Date of Patent: Jun. 9, 2009

(54) ARTIST DIRECTED VOLUME PRESERVING DEFORMATION AND COLLISION RESOLUTION FOR ANIMATION

(75) Inventors: Feng Xie, Belmont, CA (US); Nick Foster, Los Angeles, CA (US); Peter Farson, Glendale, CA (US)

(73) Assignee: Dreamworks Animation LLC, Glendale, CA (US)

( * ) Notice: Subject to any disclaimer, the term of this patent is extended or adjusted under 35 U.S.C. 154(b) by 286 days.

(21) Appl. No.: 11/262,472

(22) Filed: Oct. 28, 2005

(65) Prior Publication Data

US 2007/0097125 A1    May 3, 2007

(51) Int. Cl.
*G06T 15/70* (2006.01)
*G06T 17/30* (2006.01)

(52) U.S. Cl. .................... 345/473; 345/474; 345/475

(58) Field of Classification Search .......... 345/473, 345/474
See application file for complete search history.

(56) References Cited

U.S. PATENT DOCUMENTS

| | | | | |
|---|---|---|---|---|
| 4,821,214 | A * | 4/1989 | Sederberg | 345/420 |
| 5,548,694 | A * | 8/1996 | Frisken Gibson | 345/424 |
| 5,731,819 | A * | 3/1998 | Gagne et al. | 345/647 |
| 5,796,400 | A * | 8/1998 | Atkinson et al. | 345/420 |
| 5,818,452 | A * | 10/1998 | Atkinson et al. | 345/420 |
| 5,883,631 | A * | 3/1999 | Konno et al. | 345/423 |
| 5,912,675 | A * | 6/1999 | Laperriere | 345/473 |
| 6,069,634 | A * | 5/2000 | Gibson | 345/424 |
| 6,204,860 | B1 * | 3/2001 | Singh | 345/420 |
| 6,236,403 | B1 * | 5/2001 | Chaki et al. | 345/420 |
| 6,535,215 | B1 * | 3/2003 | DeWitt et al. | 345/473 |
| 6,593,927 | B2 * | 7/2003 | Horowitz et al. | 345/473 |
| 6,608,631 | B1 * | 8/2003 | Milliron | 345/647 |
| 6,693,631 | B2 * | 2/2004 | Hubeli et al. | 345/420 |
| 6,731,287 | B1 * | 5/2004 | Erdem | 345/473 |
| 6,867,769 | B1 * | 3/2005 | Toriya et al. | 345/420 |
| 6,970,171 | B2 * | 11/2005 | Baraff et al. | 345/473 |
| 7,091,975 | B1 * | 8/2006 | Cohen et al. | 345/473 |
| 7,221,379 | B2 * | 5/2007 | Mullins et al. | 345/648 |
| 7,221,380 | B2 * | 5/2007 | Hunter et al. | 345/648 |
| 7,242,405 | B2 * | 7/2007 | Cohen et al. | 345/473 |

(Continued)

OTHER PUBLICATIONS

Alan H. Barr, "Global and local deformations of solid primitives", ACM SIGGRAPH Computer Graphics, v.18 n.3, p. 21-30, Jul. 1984.*

(Continued)

*Primary Examiner*—Kee M Tung
*Assistant Examiner*—Roberta Prendergast
(74) *Attorney, Agent, or Firm*—Morrison & Foerster LLP

(57) ABSTRACT

A computer-based animation method and system for deforming animated characters (people, animals, etc.) using a volume preserving and collision resolution process for the animation. Parts of a character are deformed by a soft mesh deformation to emulate skin deformation due to flesh and muscle movement driven by the rigid body animation along the character's joints. Resolution of the interpenetration or volume loss of deformed parts is needed for smooth and realistic animation. The present method and system enable automatic collision resolution, allowing local deformations on two intersecting parts of a character so the parts no longer interpenetrate, while preserving the volume and general shape of the two parts, e.g., the character's torso and a limb.

34 Claims, 18 Drawing Sheets

U.S. PATENT DOCUMENTS

| | | | |
|---|---|---|---|
| 7,286,127 B2 * | 10/2007 | Zhou et al. | 345/420 |
| 7,307,633 B2 * | 12/2007 | Anderson et al. | 345/473 |
| 2001/0030646 A1 * | 10/2001 | Hubeli et al. | 345/420 |
| 2004/0227760 A1 * | 11/2004 | Anderson et al. | 345/473 |
| 2004/0227761 A1 * | 11/2004 | Anderson et al. | 345/473 |
| 2005/0007370 A1 * | 1/2005 | Hunter et al. | 345/473 |
| 2005/0030310 A1 | 2/2005 | Hunter et al. | |
| 2006/0125830 A1 * | 6/2006 | Piponi | 345/473 |
| 2006/0290693 A1 * | 12/2006 | Zhou et al. | 345/420 |
| 2007/0002042 A1 * | 1/2007 | Baraff et al. | 345/420 |

OTHER PUBLICATIONS

Joukhadar, A. et al., "Fast contact detection between moving deformable polyhedra", Proceedings IEEE/RSJ International Conference on Intelligent Robots and Systems, IROS '99, vol. 3, Oct. 17-21, 1999, pp. 1810-1815.*

Danny M. Kaufman, et al., "Fast frictional dynamics for rigid bodies", ACM Transactions on Graphics (TOG), v.24 n.3, Jul. 2005.*

Matthew Moore, et al., "Collision detection and response for computer animation 3", ACM SIGGRAPH Computer Graphics, v.22 n.4, p. 289-298, Aug. 1988.*

Demetri Terzopoulos, Kurt Fleischer, "Modeling inelastic deformation: viscolelasticity, plasticity, fracture", ACM SIGGRAPH Computer Graphics, v.22 n.4, p. 269-278, Aug. 1988.*

Ziegler, Rudolph F., "Character animation using transformation-based linear dynamics", M.Sc., University of Toronto (Canada), 1997, 121 pages.*

Hong, et al., 2005, "Fast volume preservation for realistic muscle deformation", ACM SIGGRAPH 2005 Sketches, Jul. 31-Aug. 4, 2005, J. Buhler, Ed., SIGGRAPH '05, ACM, New York, NY, p. 28.*

Hubeli, A. and Gross, M. 2000, "Fairing of non-manifolds for visualization", Proceedings of the Conference on Visualization '00, IEEE Visualization, IEEE Computer Society Press, pp. 407-414.*

Hubeli, A.; Gross, M.; "Multiresolution methods for nonmanifold models", IEEE Transactions on Visualization and Computer Graphics, vol. 7, Issue 3, Jul.-Sep. 2001 pp. 207-221.*

L. P. Nedel, D. Thalmann, "Real Time Muscle Deformations using Mass-Spring Systems", Proceedings of the Computer Graphics International 1998, Jun. 22-26, 1998, 10 pages.*

Zordan, et al., "Breathe easy: model and control of simulated respiration for animation", Proceedings of the 2004 ACM SIGGRAPH/Eurographics symposium on Computer animation, Aug. 27-29, 2004, Grenoble, France, pp. 29-37.*

Angelidis, A. et al. (Oct. 6-8, 2004). "Swirling Sweepers: Constant-Volume Modeling," *Proceedings of the 12th Pacific Conference on Computer Graphics and Applications*, Seoul, Korea, pp. 10-15.

Hirota, G. et al. (Jun. 9-11, 1999). "Free Volume-Preserving Free Form Deformation Using Multi-Level Optimization," *Proceedings of the Fifth Symposium Solid Modeling and Applications*, Ann Arbor, MI, pp. 234-245.

Rappoport, A. et al. (May 17-19, 1995). "Volume-Preserving Free-Form Solids," *Proceedings of the Third Symposium on Solid Modeling and Applications*, Salt Lake City, UT, pp. 361-372.

Singh, K. et al. (Jul. 19-24, 1998). "Wires: A Geometric Deformation Technique," *Computer Graphics Proceedings SIGGRAPH 98*, pp. 405-414.

* cited by examiner

ARTIST DIRECTED VOLUME PRESERVING DEFORMATION AND COLLISION RESOLUTION FOR ANIMATION

FIELD OF INVENTION

This invention relates to computer graphics and computer generated imaging and more specifically to computer based animation.

BACKGROUND

In computer based key frame character animation as used, e.g., to make feature films, video, etc., during the animation process, parts of the character are deformed by a soft mesh deformation to emulate skin deformation due to the character's flesh and muscle movement driven by the rigid body animation along the joints of the character. It is a tedious manual process for the animation artist (animator) to resolve the interpenetration or volume loss of the resulting deformed bodies, but both are required for the animation to look smooth and realistic. To resolve interpenetration, this process requires, for each frame, the artist to move each point inside the interpenetration region, and likely other surrounding points also. To preserve volume, the artist has to make global changes involving possibly all points in a consistent and uniform way to preserve appearance, shape and volume for each frame. To do both consistently so as to minimize "popping" across frames makes the process both time consuming and challenging for the artists.

There are publications in physics based volume preserving deformation and collision resolution; see for instance Gentaro Hirota, et al., "Volume preserved free form deformation", ACM Solid Modelling '99, 1999; and Ari Rappoport, et al., "Volume-Preserving Free-Form Solids", ACM Symposium on Solid Modelling, 1995. This type of process relies heavily on the physical characteristics of the deformed body's skin, or outer surface, which makes them hard to integrate into the artist directed animation process for characters.

Physics based deformation and collision resolution thus is difficult to integrate into artist driven character animation. The following exemplary publications are more closely related to computer based character animation: Alexis Angelidis, et al. "Swirling Sweepers: Constant volume modeling", Pacific Conference on Computer Graphics, 2004; and Karen Singh, et al. "Wires: A geometric deformation technique", Proceedings of SIGGRAPH, 1998.

SUMMARY

Angelides' "Swirling Sweepers" provides a volume preserving deformation process only for surfaces of revolution. It is suitable only for objects enclosed by surfaces that can be modeled a sweeping a curve around a central axis. Though preserving volume, the types of animated bodies these surfaces can model are limited; most animated character body shapes do not revolve around a central axis symmetrically. Singh's "Wires" describes a general shape animation framework that does not solve the problem of interpenetration or volume preservation.

The above methods are not fully suitable for computer based character animation since they leave too much work to the animation artist (animator) to manually adjust each animation key frame to accomplish volume presentation. (Animation conventionally consists of a sequence of frames, typically 24 or 30 per second of which typically every $3^{rd}$ to $5^{th}$ "key" frame is animated by the artist using computer enabled animation techniques, the intermediate frames being generated by computer software interpolation.) This manual work increases animation costs and production time.

We have developed a geometric collision resolution and volume preservation process that eliminates the tedium of manual collision resolution for the artist while giving him maximum artistic control over the deformation process. This is a volume preserving deformation and collision resolution process for deforming animated characters such as people, robots, vehicles, animals, etc. This is innovative in terms of artist directed collision resolution and volume preservation for deformable bodies in computer based animation.

Given two simply enclosed deformable three-dimensional bodies (in terms of computer generated images) that intersect (interpenetrate), we make local deformations as needed on the surfaces of both bodies so that the two bodies no longer interpenetrate, while preserving the volume and general shape of the two bodies. (Depicting the bodies in three dimensions is conventional and essential for realistic animation.) In an artist directed character animation, for characters with relatively voluminous and deformable bodies, this process increases the artist's efficiency by enabling computer automated collision resolution of the two bodies, so the artist does not have to manually deform each point on the bodies' surfaces to separate their interpenetrating volumes. Typical such bodies are the animated character's torso and limbs or head. It is to be emphasized that this disclosure relates to computer generated imaging, and depiction of such images, rather than to manipulation of actual physical objects. The goal is to improve the visual appearance of the animated character, instead of performing physically correct simulation. Also disclosed is a computer readable medium for carrying out the method, and a computer enabled system.

BRIEF DESCRIPTION OF THE DRAWINGS

All the figures depict the projection of 3D (three-dimensional) surfaces onto a 2D (two-dimensional) image screen. The 3D mesh (intersections in a grid).

DETAILED DESCRIPTION

In one embodiment, the present system and method operate as follows on computer generated images of 3D enclosed bodies. The two body collision resolution includes these phases:

1. Detect and isolate the intersection region of the two bodies.

2. Deform the location of all points within the intersection region to remove the interpenetration.

3. Pump out (increase volume of) the points on the bodies that are not inside the intersection region so as to preserve the volume of the bodies.

4. Smooth out the crevices caused by the resulting local deformations by slightly displacing each point near the intersection region by a weighted sum of its neighbors' displacements.

5. Most animated characters consist of five or more bodies (e.g. trunk plus head and limbs); the present method applies to each pair of such bodies.

Figure 1:
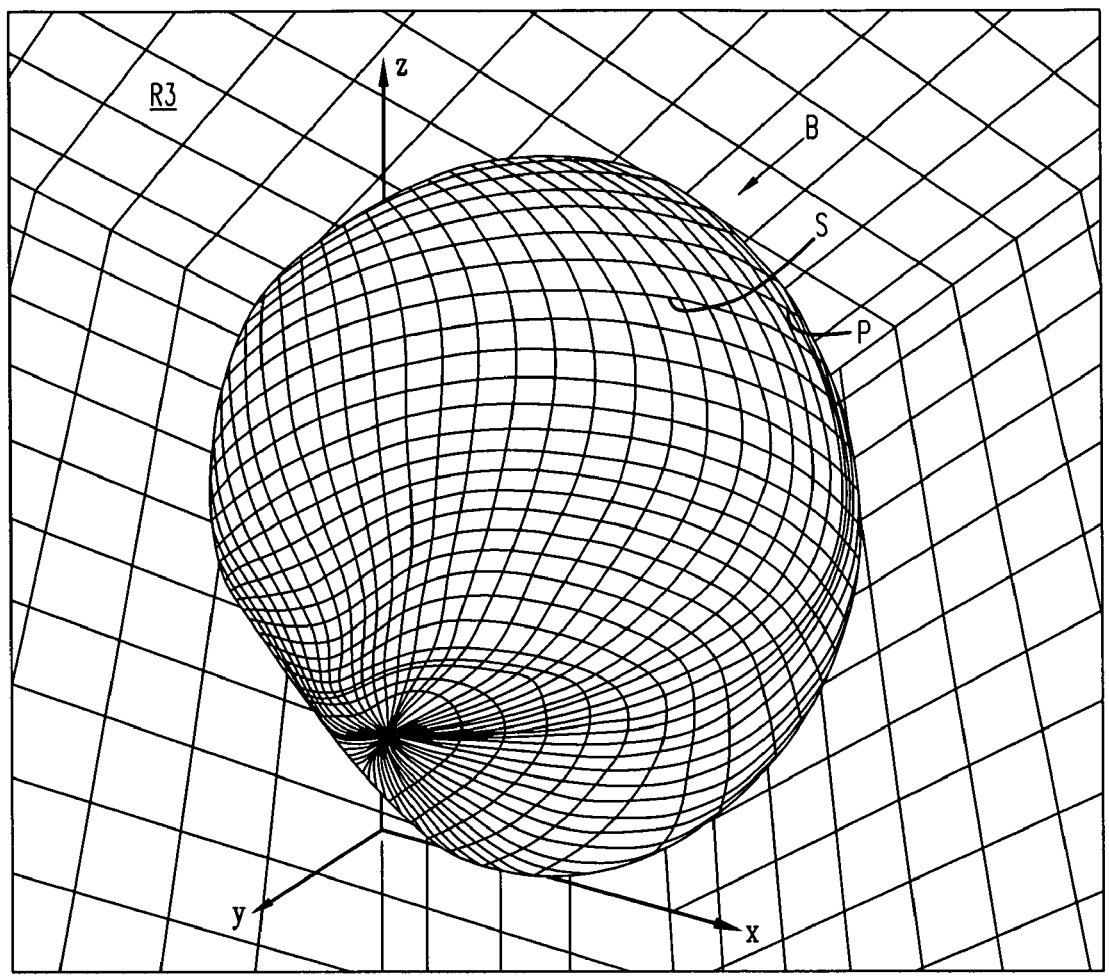
FIG. 1 shows a simple enclosed body in 3 dimensions.

Relevant aspects and definitions are as follows: Body B is a simply enclosed body (see FIG. 1) if the boundary of body B is a simple closed surface S that does not self intersect. Surface S is enclosed if for every point in the 3-dimensional space R3 defined by axes x, y, z, it is well defined if any point p in space R3 is either inside or outside of surface S. (Being a geometric object, surface S has no thickness.)

Figure 2:
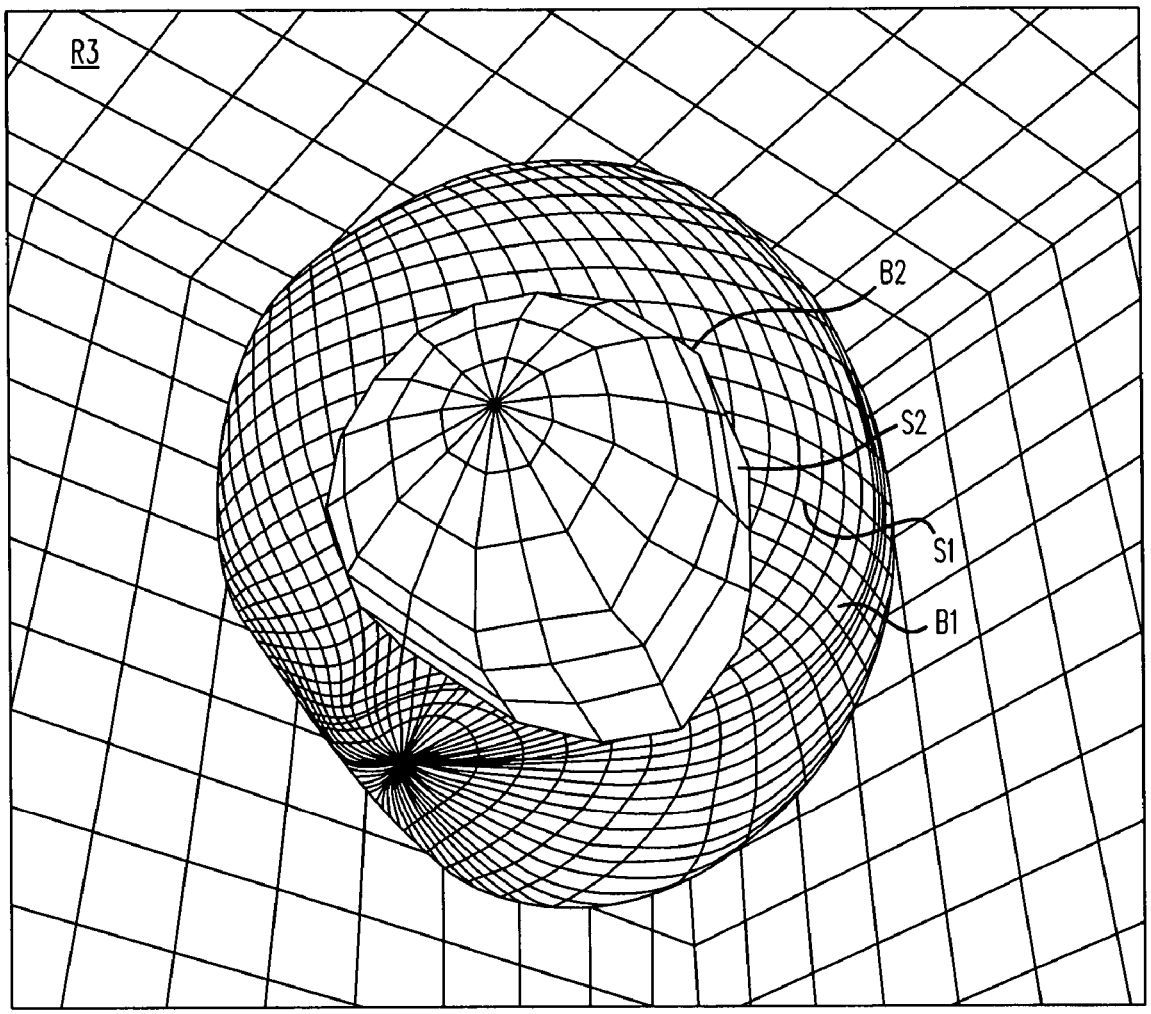
FIG. 2 shows two 3D intersecting enclosed bodies.

Intersection of two simply enclosed bodies: The intersecting or intersection region of two enclosed bodies B1, B2 (see FIG. 2) is the set of points in space R3 that are inside both the boundary of body B1 and the boundary of body B2.

Numerical approximation is accomplished by surface sampling: Take n sampled points p on the boundary surface S of body B, where the polygonalization of the n points P is an approximation of surface S. As the number n goes to infinity, the approximation becomes surface S.

Figure 3:
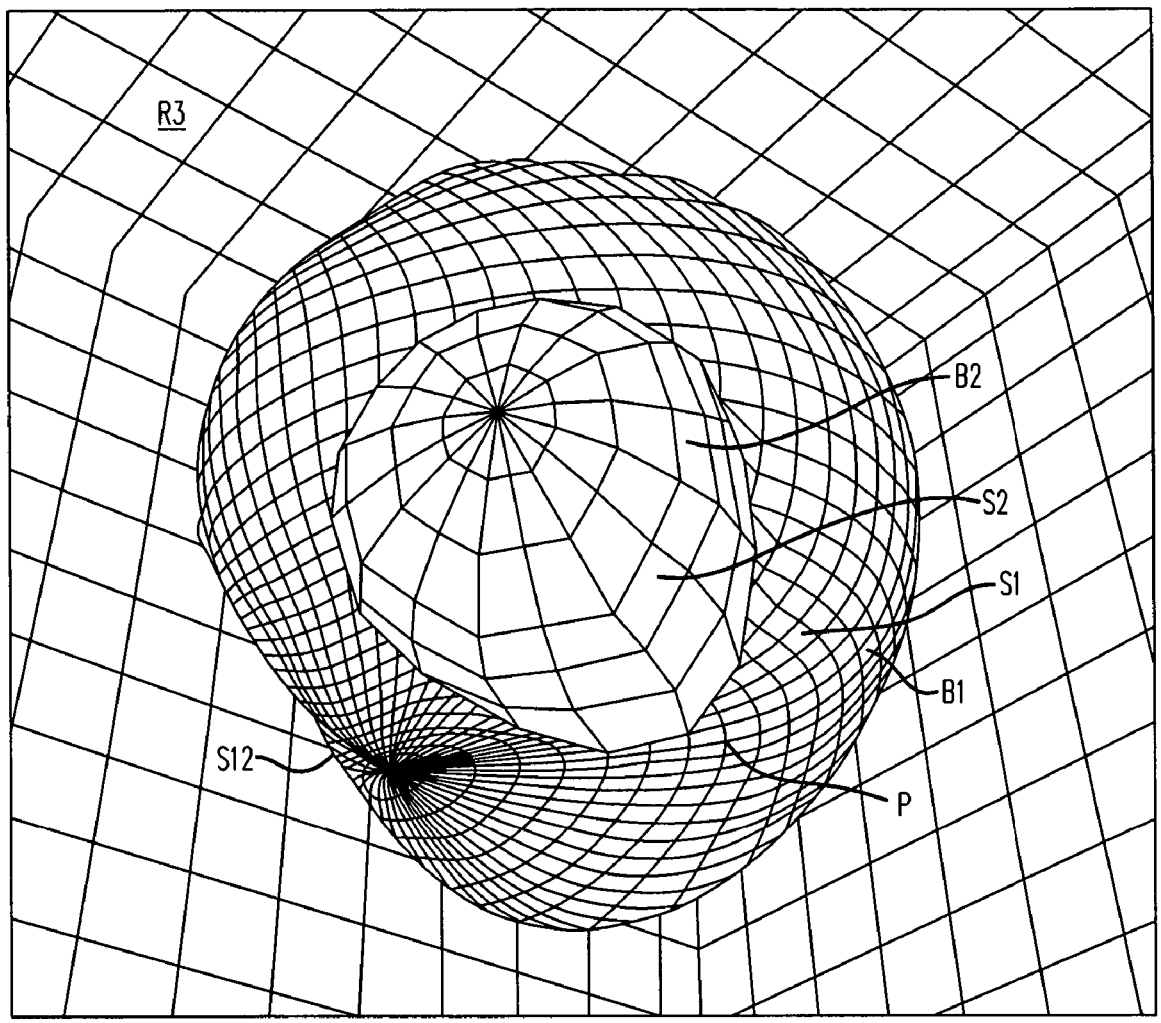
FIG. 3 shows collision resolution of the FIG. 2 situation.

Collision Detection: Two bodies B1 and B2 intersect if the interiors of their respective surfaces S1 and S2 intersect, which means there are some points in surface S1 that are also inside surface S2 and vice versa (see FIG. 3). In one embodiment surface S1 defines the character's torso B1 and is the "master" body, while surface S2 defines an associated head or limb (arm or leg or tail) B2 and is the "slave" body. Typically for collision resolution (removal) purposes the subsequent deformation is of the master body B1 which has more volume and so is more easily subject to displacement of its surface S1 while preserving the general appearance of body B1.

Local collision resolution: Displace the points on surface S1 that are inside surface S2 until they are no longer inside surface S2. Displace the points on surface S2 that are inside the deformed surface S1 until they are no longer inside surface S1.

This local collision resolution, in detail, has these steps expressed geometrically:

1. For every point p on surface S1, given deformation direction dir(p), compute the safe deformation distance for point p, which is safeDist(p).

2. For every point pi inside the S1-S2 intersection region S12, find the minimum displacement distance to move point p out of the intersection region S12, which is dispDist(p).

3. Displace point p along dir(p) by the distance min(dispDist(p), safeDist(p)).

Safe Distance Computation: Given point p on surface S and the deformation direction dir(p), the safe distance of point p is computed by shooting a ray from point p along the direction of dir(p), and finding the closest polygon on surface S that the Ray(p, dir(p)) intersects, where the distance of point p from that closest polygon along Ray(p, dir(p)) is the safe distance of point p.

Collision region computation: Given point p on surface S1, point p is inside the collision region of surface S12, if p is inside of surface S2. Point p is inside of surface S2 if Ray(p, dir(p)) intersects with a polygon on surface S2.

Computing the displacement distance for collision removal: Given point p in intersection region S12, find the closest polygon "closestPoly" on surface S2 that intersects with Ray (p, dir(p)). The distance from point p to "closestPoly" along the ray is the displacement distance required to move point p out of the intersection (collision) region S12. If the collision removal displacement is less than the safe distance of point p along dir(p), then we can perform safe collision removal, otherwise we displace point p by the safe distance to reduce the intersection region. After collision resolution for all points p on surface S1 inside collision (intersection) region S12 are performed, we perform the same operation for all points p on surface S2 that are still inside the collision region of S21', which is the intersection region of surface S2 within the locally displaced surface S1. (The terms "collision region" and "intersection region" are used interchangeably in this disclosure.)

The apparent cavity in the lower part of B1 is not actually a cavity, it is sharp crevices formed by the local deformation to resolve collision. This demonstrates the necessity of the present volume pumping and smoothing process.

An alternate to master-slave collision resolution is peer to peer collision removal: when two bodies B1 and B2 are symmetrical in shape and motion, for example, two of the animated character's legs moving towards each other (in a squeeze motion), where we may use a peer-peer collision resolution model by displacing the two body regions that are in collision symmetrically.

For the displacement direction, given a point p on surface S, the default displacement direction is the direction normal of point p with respect to surface S. (In other words, a direction passing through point p that is orthogonal to the tangent plane of S at point p.) The physical interpretation for this is that under uniformly applied pressure, the surface S will either expand and shrink uniformly; which means that every point p is slightly displaced along its normal (outwards for expansion, inwards for shrinking). Given the geometry of the collision region's center and axis, we alternatively use a displacement direction that is a combination of the point p normal and the collision axis; this gives an interpretation of the direction to which point p is most likely to deform.

Hence the displacement direction is point normal, or a weighted combination of point normal and the collision axis. The collision axis is defined as the ray connecting the center of the collision region of the first body to the center of the collision region of the second body. Thus the artist (animator) has the option to select either the normal or a combination of the normal and collision axis to be the displacement direction that achieves the best look for him. The selection of the collision displacement direction is on a per collision body pair basis. The collision axis for each pair of collision bodies is computed at the line defined by the two collision centers, which are the center of the collision region of body B1 and the center of the collision region of body B2.

A KD tree (a well known type of space partitioning data structure for organizing points in space) is used for the above ray to polygon mesh intersection testing in one embodiment; alternative spatial data structures may be used, for example, octree, or bsptree of hierarchical bounding volumes.

After the body B has been locally displaced to resolve the collision, we pump it out to preserve its volume. We constrain the pumping to points not displaced by the earlier collision resolution to minimize introducing collision again during pumping. We pump (dislocate) a point p out along the normal of the surface of body B at point p (see FIG. 4).

Figure 5A:
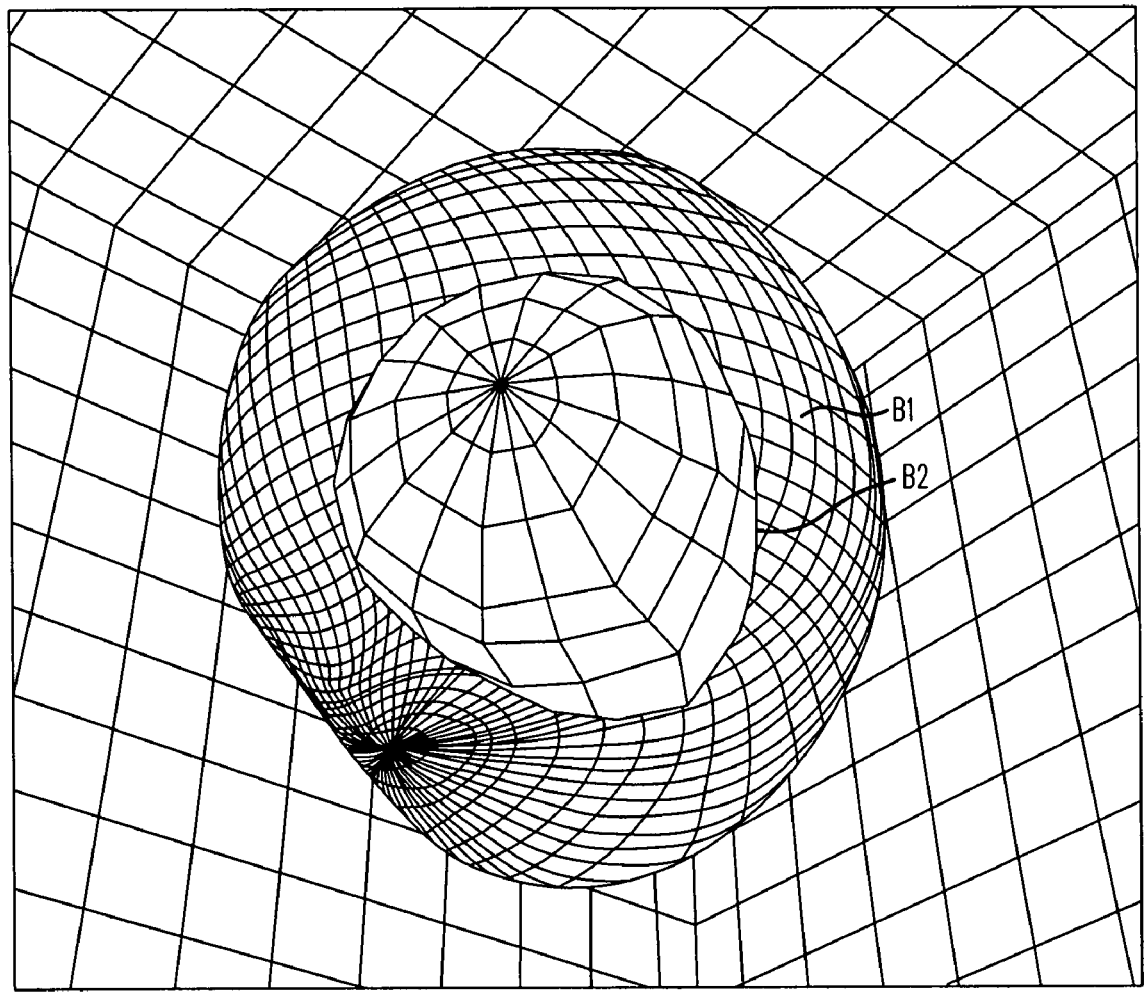
FIGS. 5A-5D show the pumping out process for two bodies.

An example of the pumping out process is shown sequentially in FIGS. 5A to 5D for two bodies B1, B2. FIG. 5A shows the two bodies as animated (in one frame) originally.

Figure 5B:
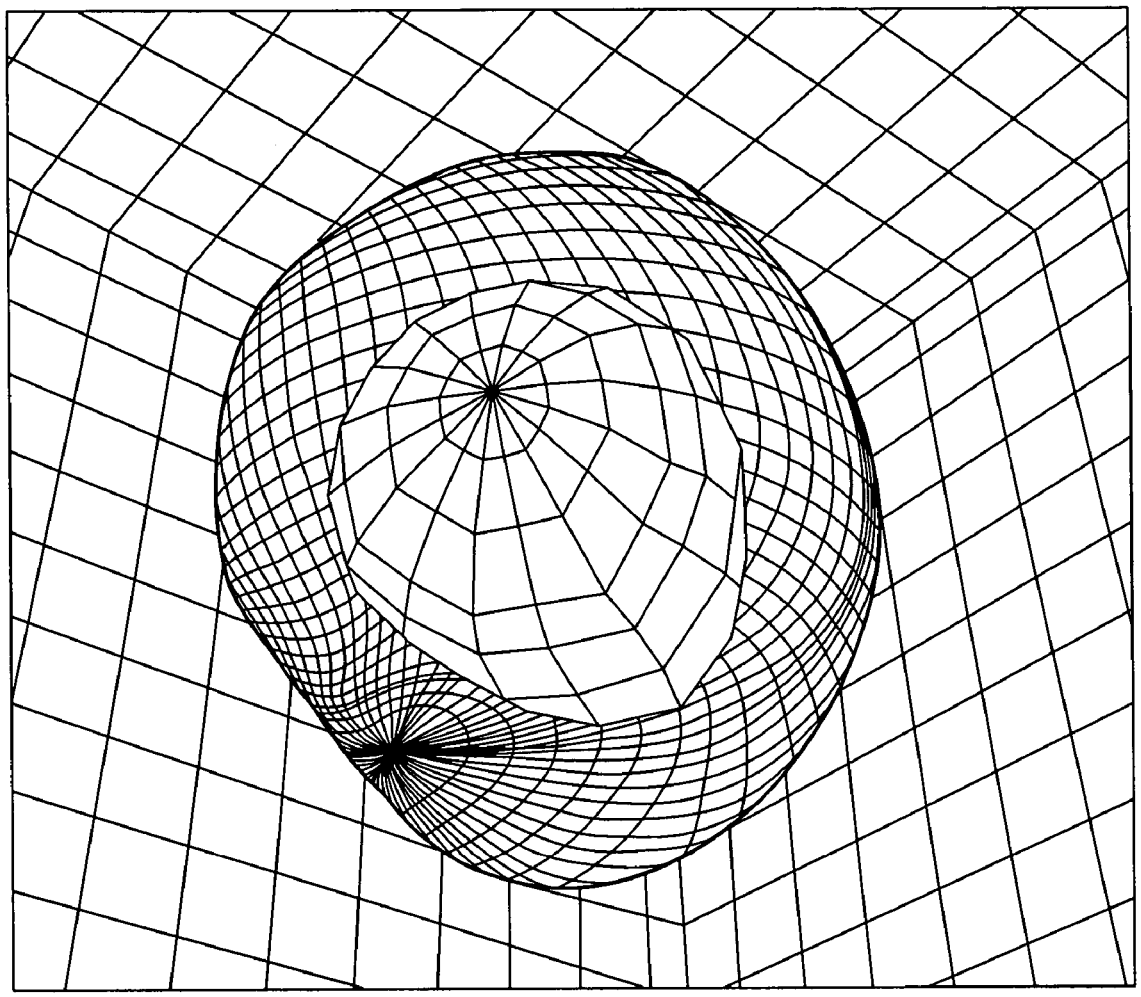
Figure 5C:
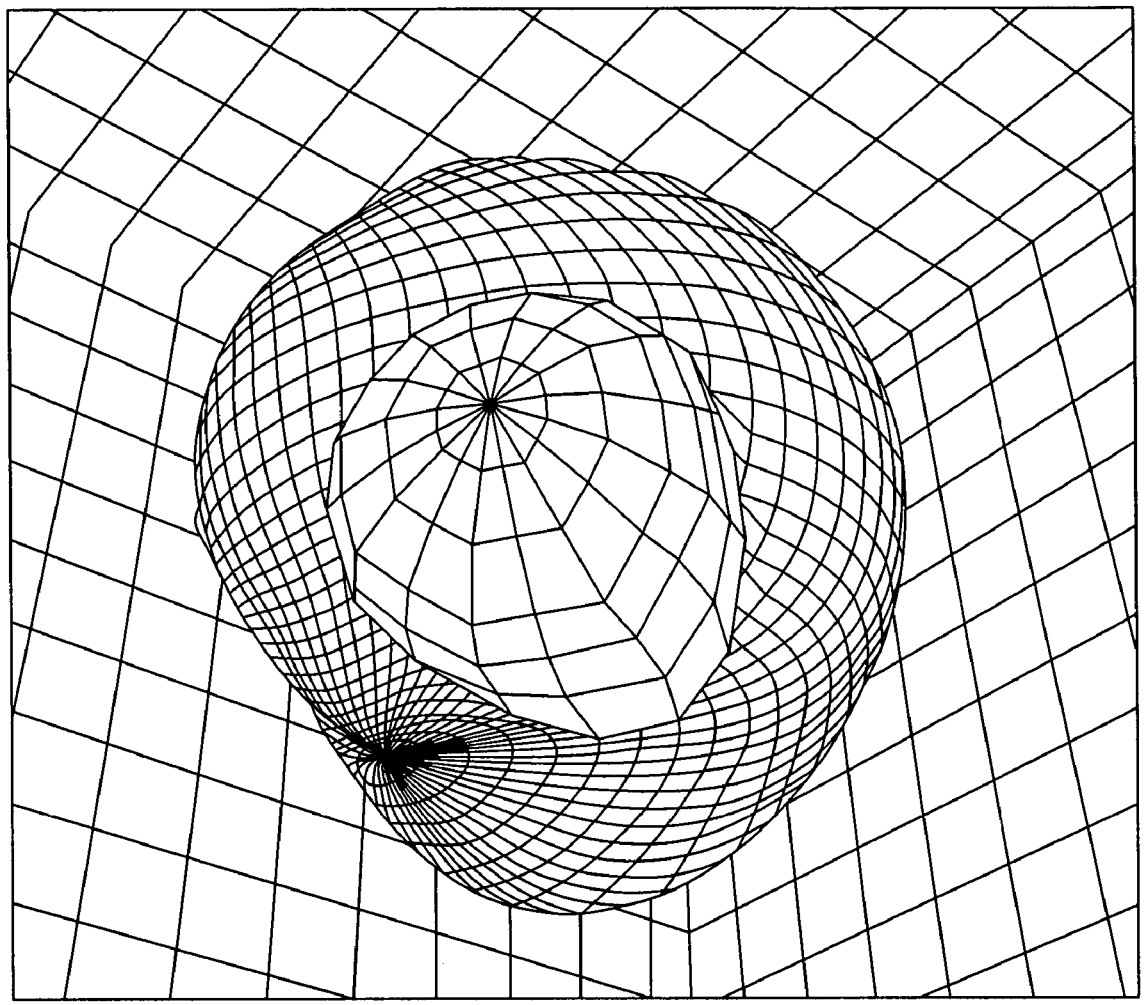
Figure 5D:
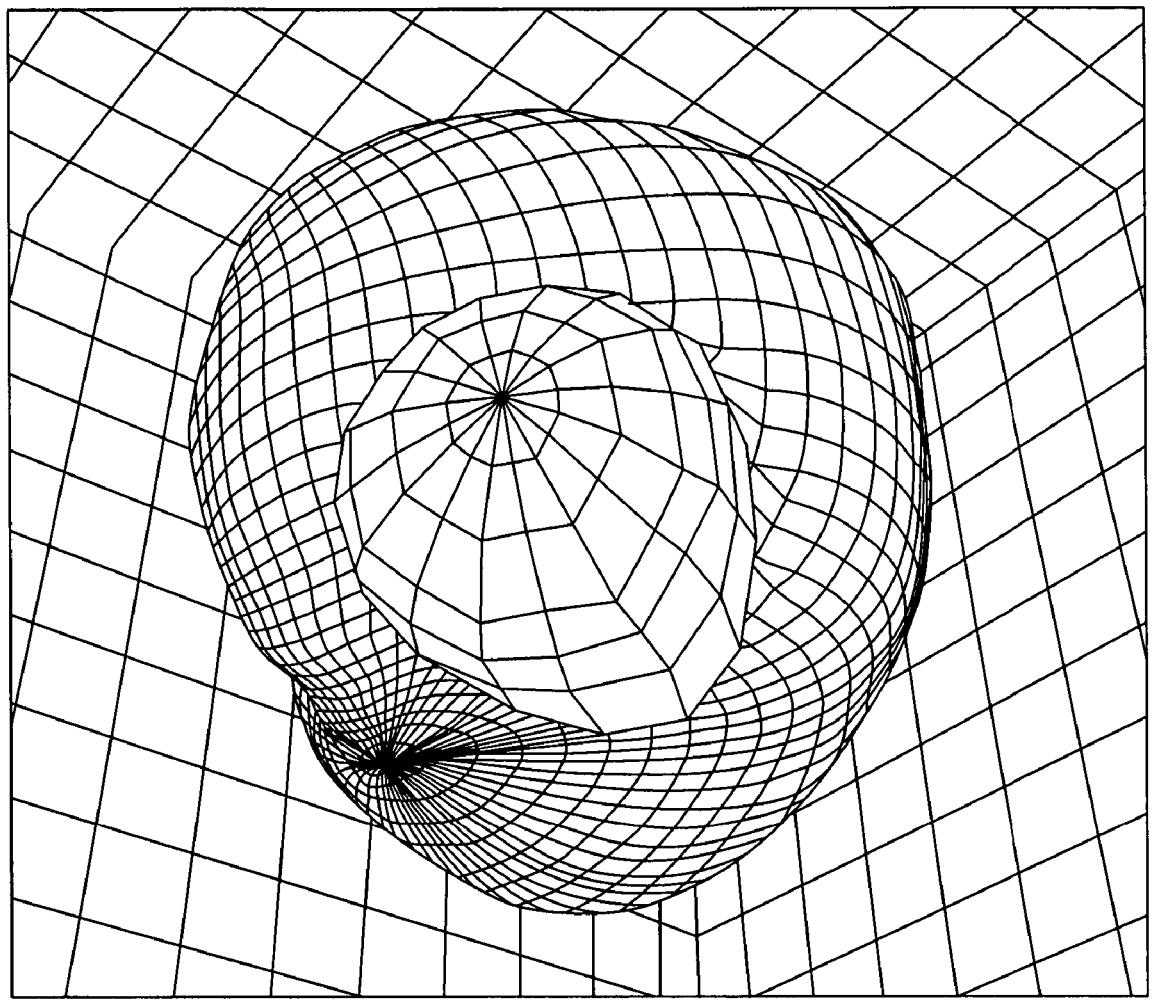
Figure 6A:
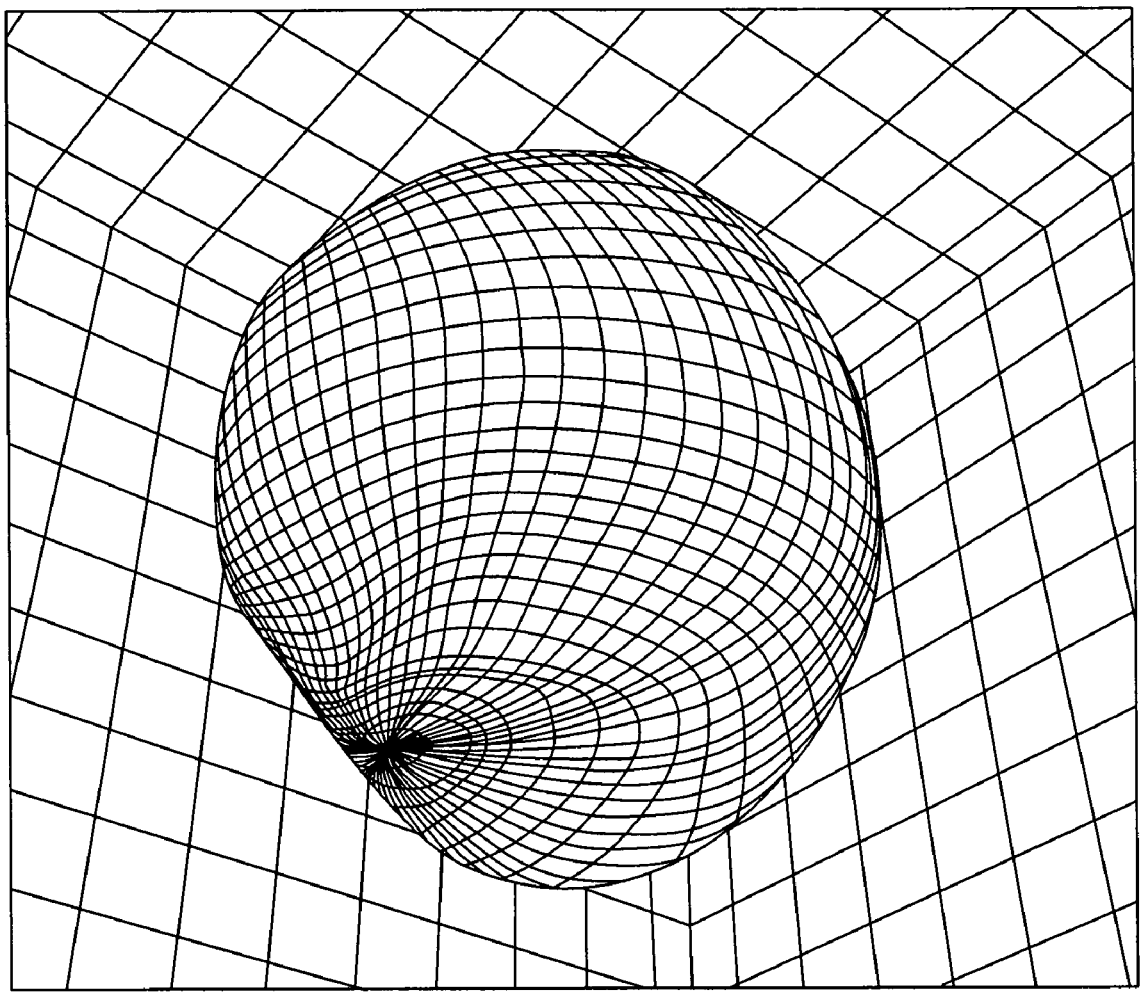
FIGS. 6A-6D show the pumping out process for one body.
Figure 6B:
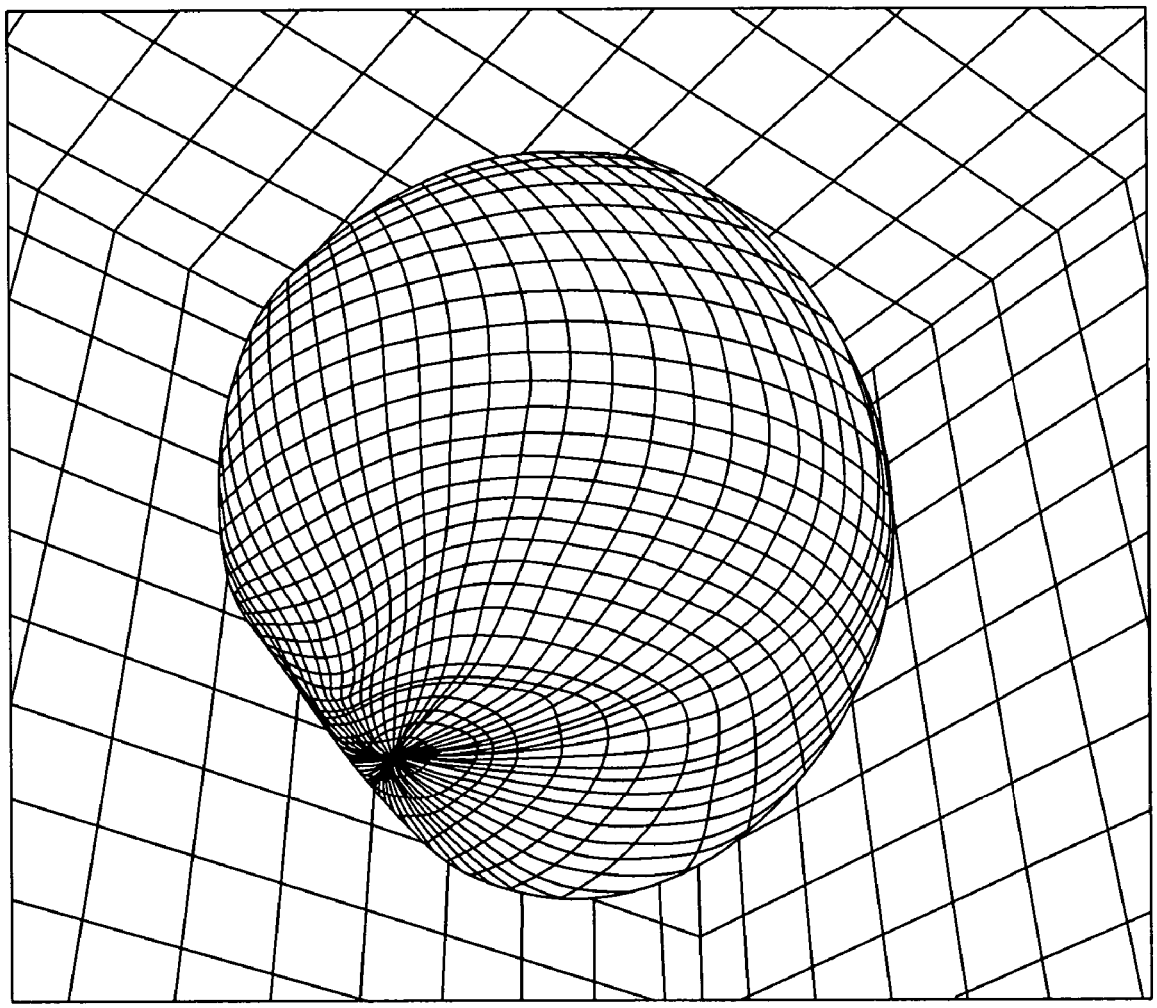
Figure 6C:
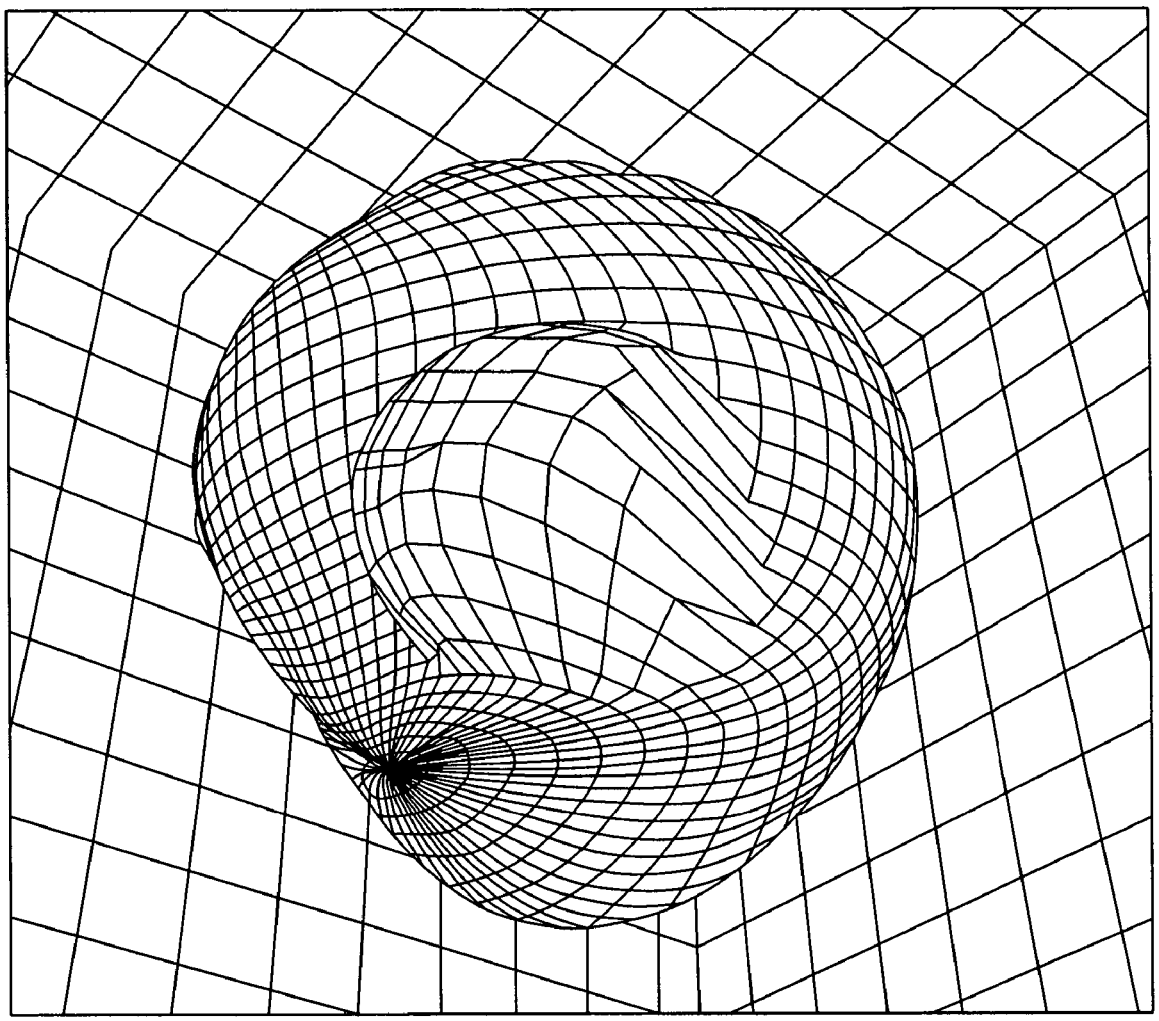
Figure 6D:
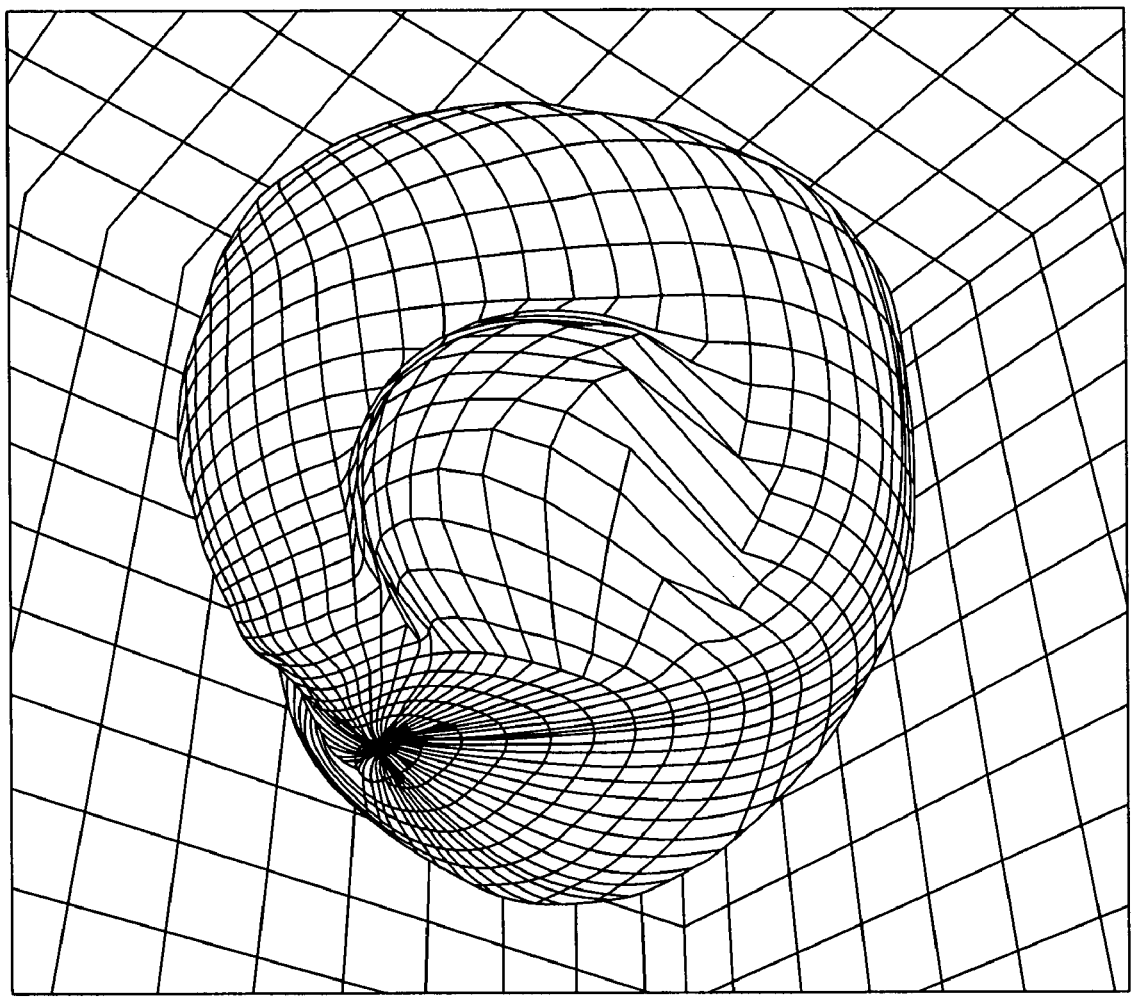

FIG. 5B shows the same two bodies after collision resolution; FIG. 5C after the volume pumping after the collision resolution; FIG. 5D after the subsequent smoothing, following the volume pumping. For better understanding, the larger (master) body B1 only of FIGS. 5A to 5D is shown in the same series of steps in FIGS. 6A to 6D (hence the smaller slave body B2 is omitted from FIGS. 6A to 6D only for purposes of understanding). Hence FIGS. 6A to 6D respectively illustrate the original animated frame of the single master body B1, the master body after collision resolution, the master body after the volume pumping, and the master body after smoothing.

The process for volume pumping (restoration) is as follows:

1. Compute the initial volume of body B, as: Vol(B)=sum of (area of polygon * dist(polygon, center of B)) where the polygon is a part of the surface S enclosing body B. The volume is approximated as a sum of volume of elements, where each element is a conical object with a polygon base and a height defined as the distance from the polygon base center to the center of the body.

2. Compute similarly the deformed volume of body B (post deformation and/or local collision resolution).

3. For each point p on surface S of Body B, compute the pumpweight(p); the pump weight of each point p is a combination of an artist determined pumping weight (artist weight (p)), the normalized distance to the collision region's center (potentially the center of pressure distance-to collision-center), and the normalized weighted area of all polygons around the point p (summed-poly area-around CP)). The center of collision region is the center of mass of all points inside the collision region (prior to collision removal). The artist (user) determined pumping weight or value gives the artist control of the bodies' shape and flexibility. The formula for the pump-weight for point p is thus: pumpweight(p)=artistweight(p) * summed_polyarea_around(p) /distance_to_collsion_center (p). The distance to the center of pressure (collision) conforms to a simple physical interpretation of a body deformed due to pressure. The summed area of the polygon on surface S around each point p is the amount of influence that displacing (pressuring) each point p has on the total volume of body B.

Figure 4:
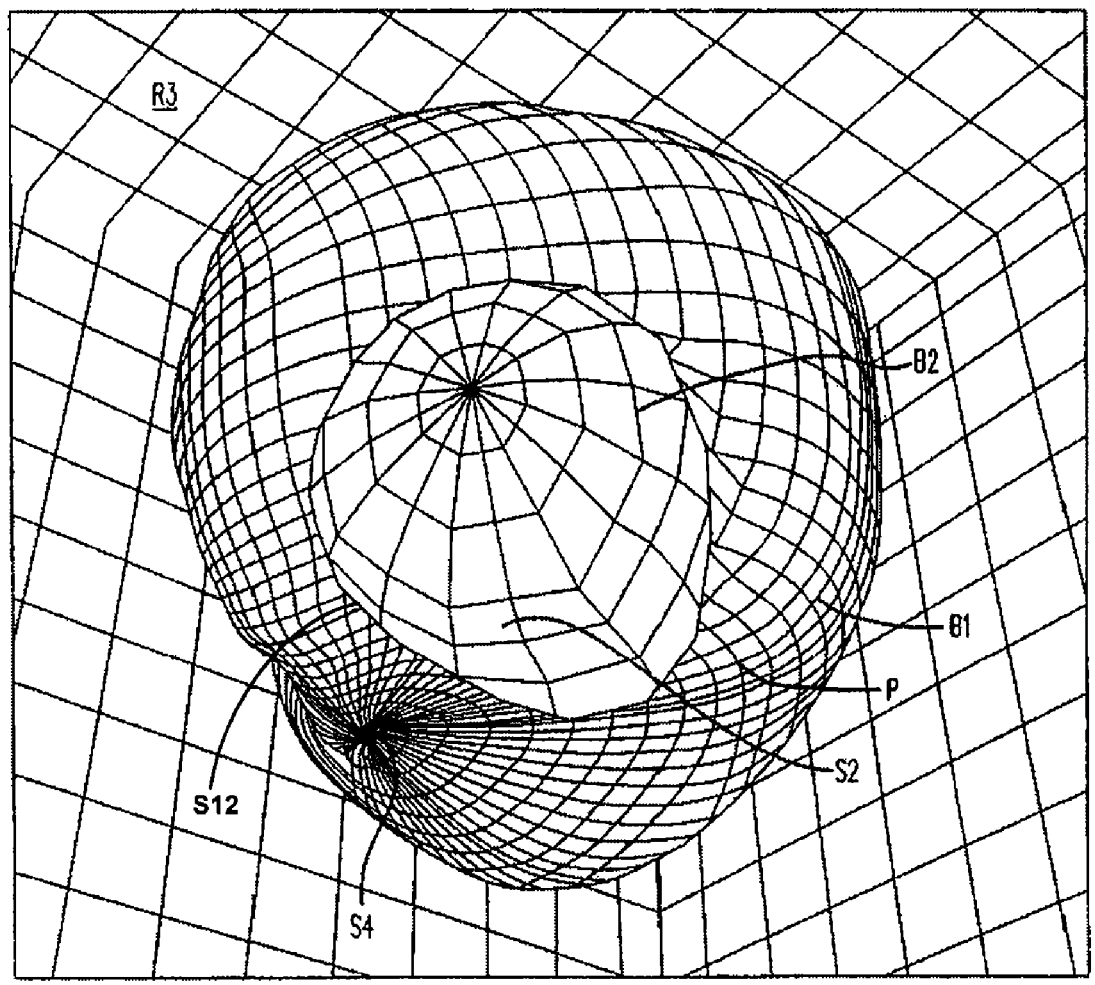
FIG. 4 shows the bodies of FIG. 3 being pumped out (volumes restored).
Figure 7:
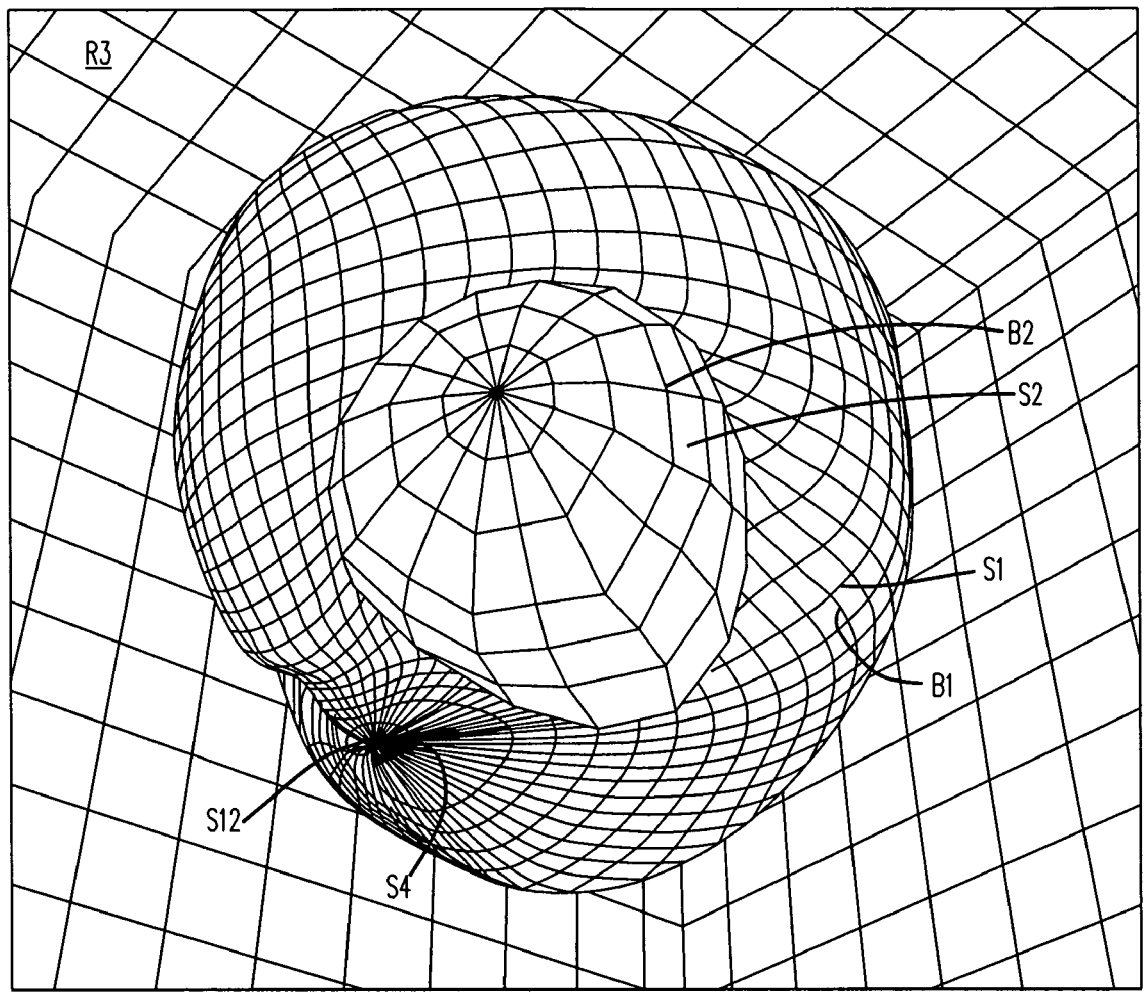
FIG. 7 shows smoothing of the intersecting region of FIG. 4.

After the above-described collision resolution and volume pumping, some regions of the body may exhibit small edge crevices (irregularities), which may be smoothed out as in regions S12, S4 as in FIG. 4. Smoothing is performed in one embodiment in regions S12 and S4 (see FIG. 7) by a simple software-implemented low pass filter that deforms the location of each point p in the creviced region(s) by a weighted sum of the neighboring points' displacements.

Since the above pumping and smoothing could undesirably introduce a new two-body collision (interpenetration), the artist (animator) has control in being able to reiterate any of the steps above (collision resolution, volume pumping, smoothing) in any order to achieve the desired look of the animation. Subsequent animation steps are conventional, including providing a "skin" (which may in fact be clothing) covering the various bodies defining the character, in conventional animation fashion.

Animators have used the present method and find it easy to control and use. The prior deformation and animation tools are easy to use for skinny or "normal" characters, but their lack of control for volume preservation and collision resolution becomes a problem for fat (obese appearing) characters.

Figure 8A:
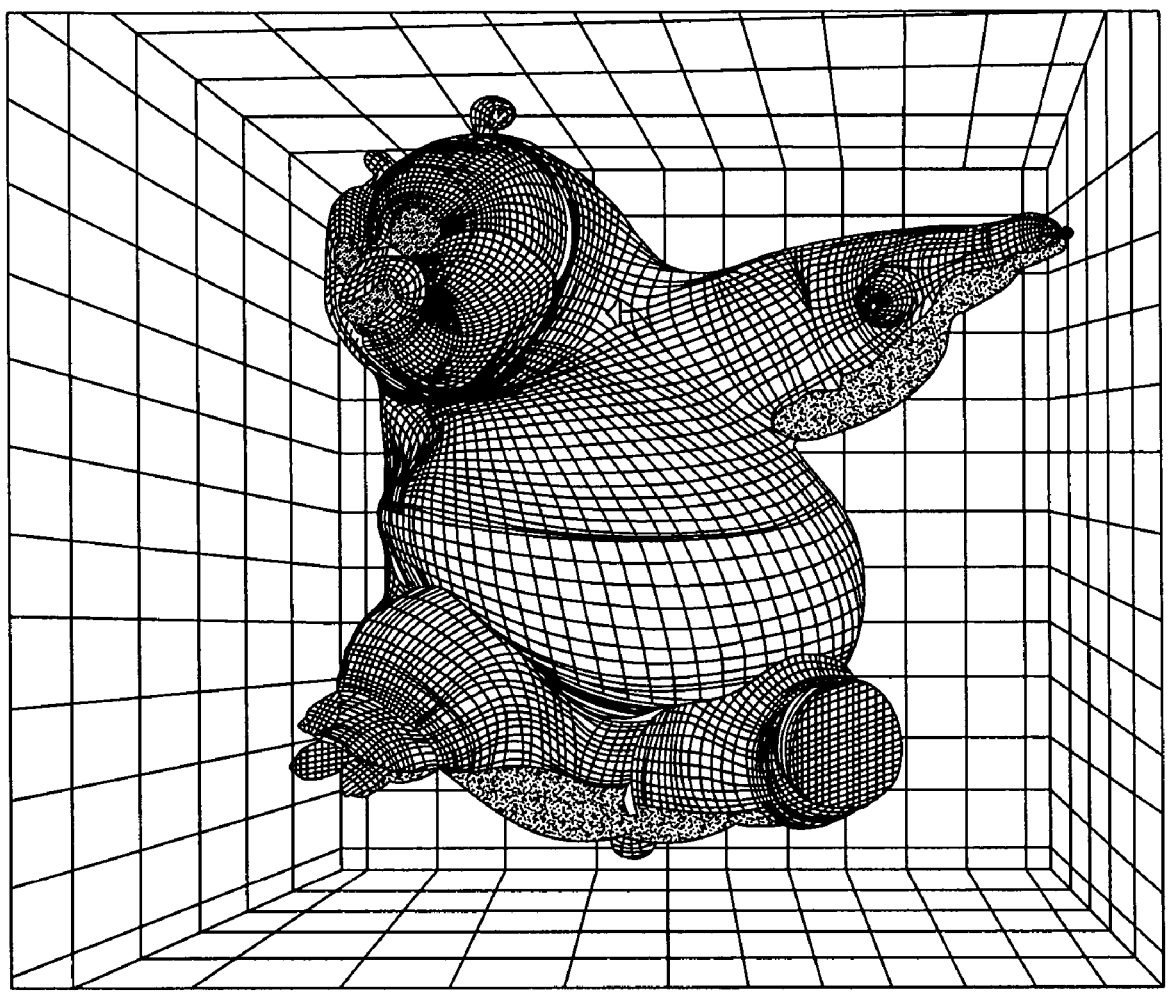
FIGS. 8A, 8B show effects of the pumping out process, as do
Figure 8B:
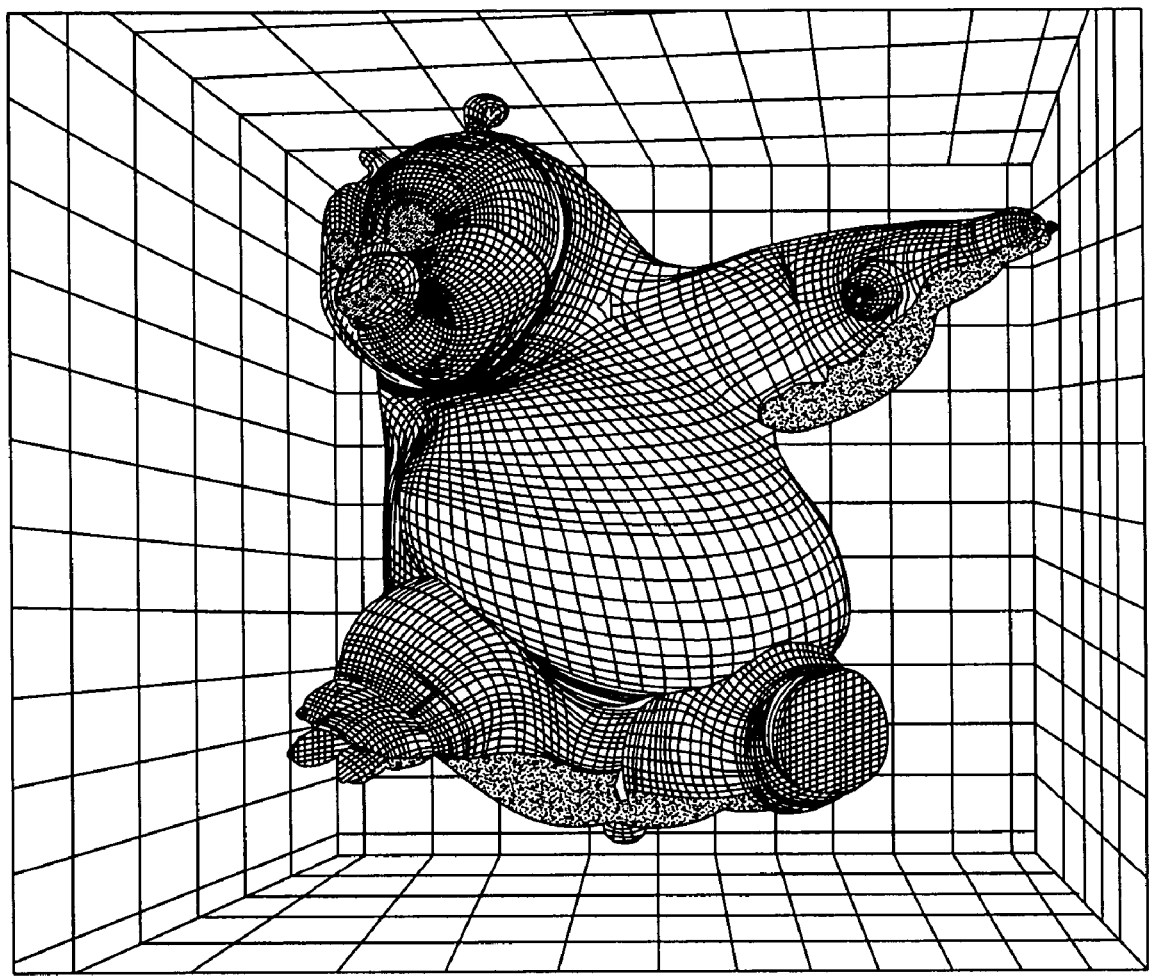
Figure 9A:
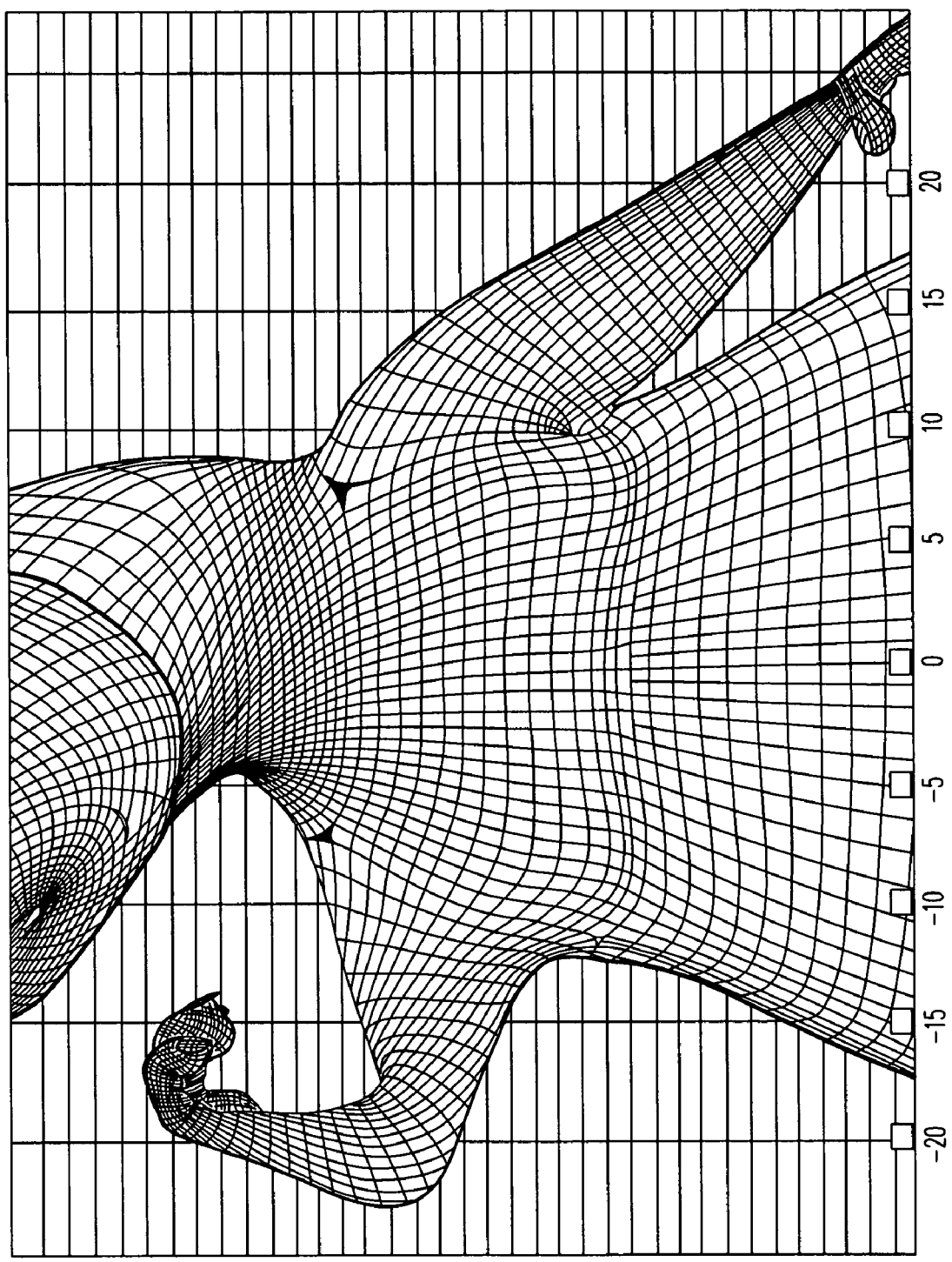
FIGS. 9A, 9B, for two different characters.
Figure 9B:
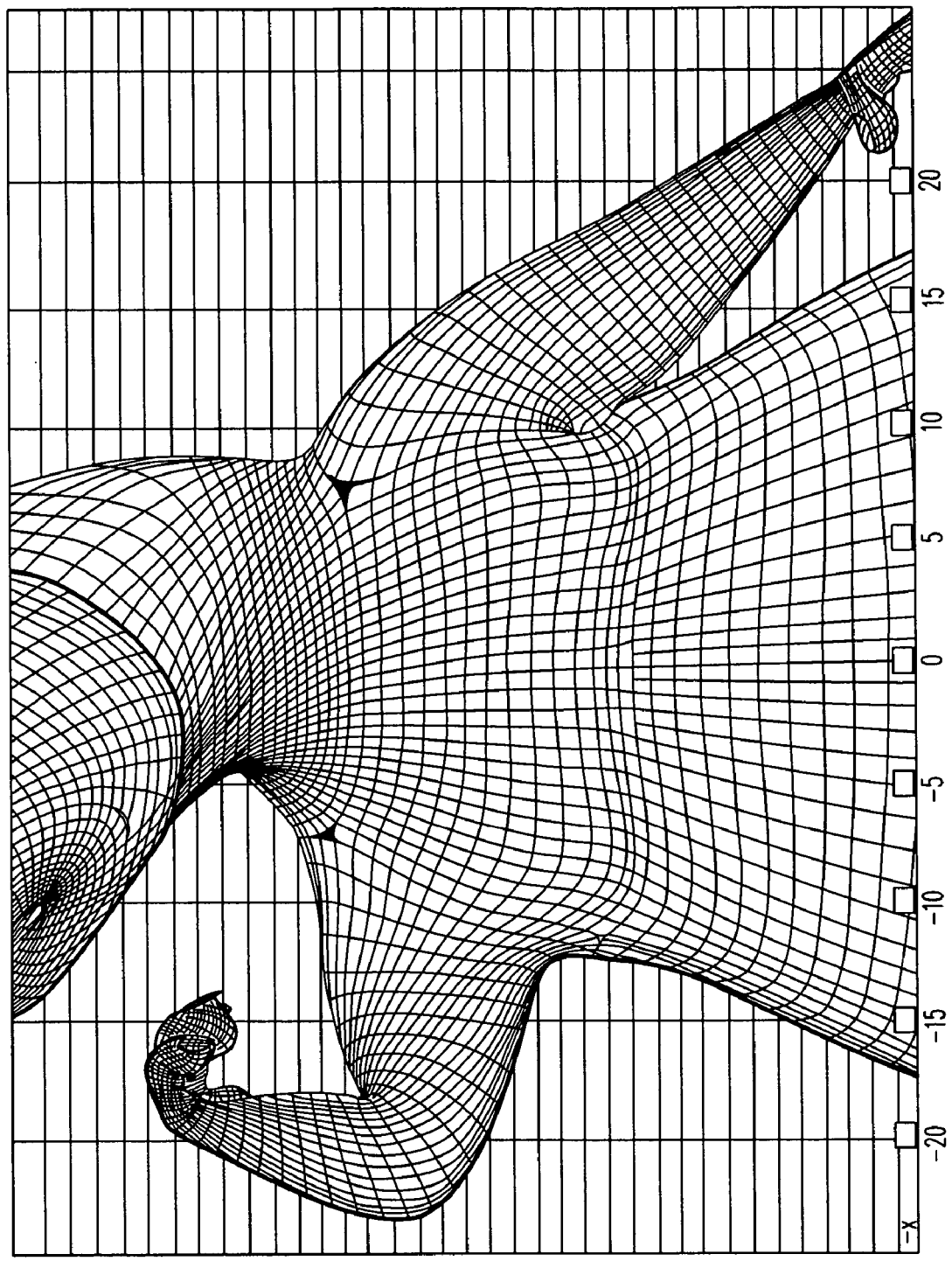

The poses that are most problematic for these fat characters are those that involve extreme movement of the backbone, forward and backward. Without the present method, the belly tends to expand unrealistically when the character bends back as shown in FIG. 8A, and likewise compress too much when it bends forward. This is resolved after use of the present process in FIG. 8B. Also in the bend forward case, the belly surface tends to have sections with excessive bunching along the surface (tangential compression). The present surface relaxation feature is helpful in dealing with this. Another related problem in fat character deformations is the "candy-wrapper" effect one gets in limbs when a character's pose has a lot of twist as in FIG. 9A (for a different character). Again, the present method minimizes this problem, as seen in FIG. 9B.

The associated computer software in one embodiment is implemented in the C programming language. Programming the software would be routine in light of the above description in the context of a computer based or enabled computer generated imaging system. It includes a conventional user interface, for artist control. The computer software in one embodiment runs at interactive rates on a conventional Pentium-based Linux workstation.

Figure 10:
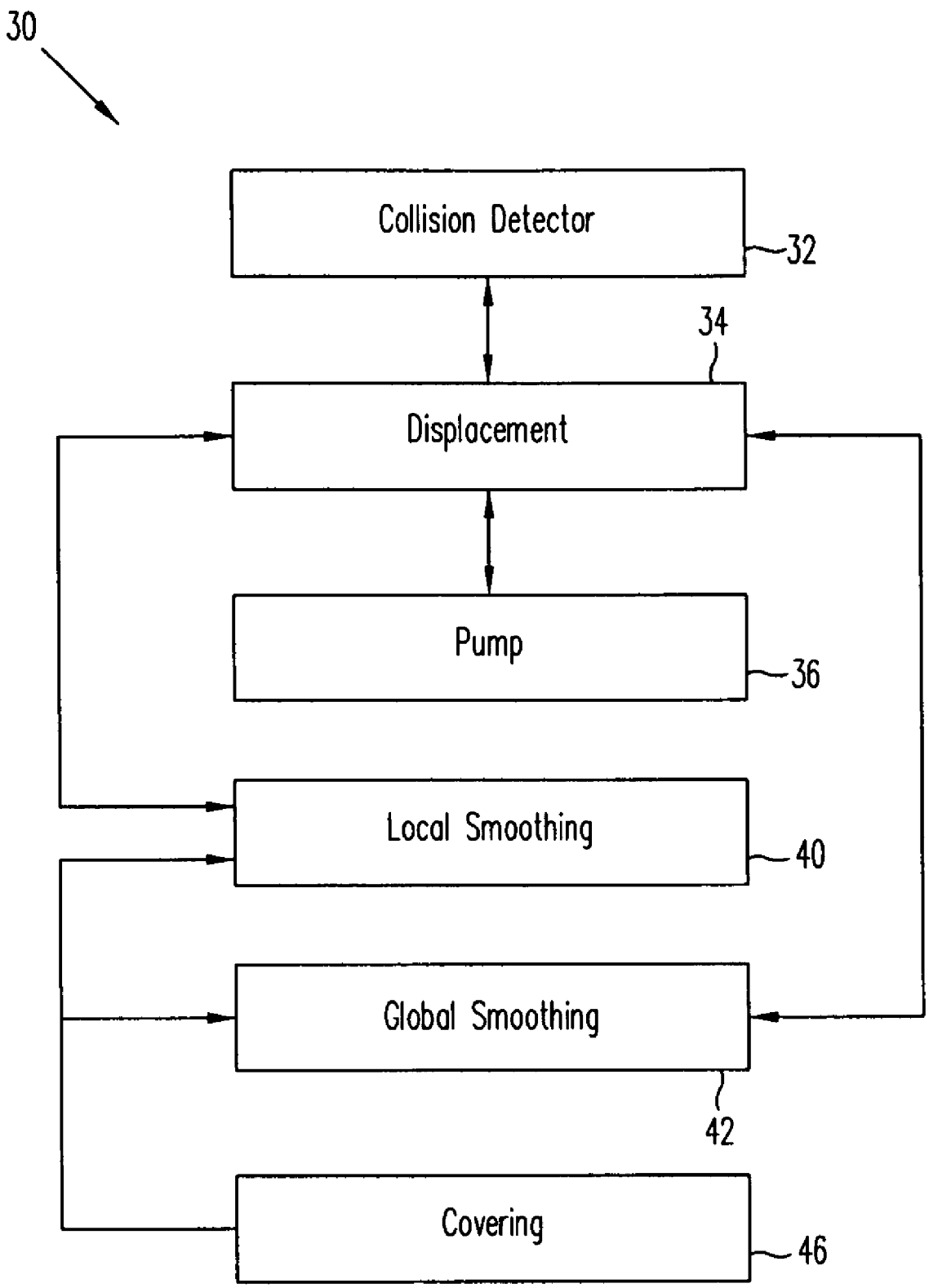
FIG. 10 depicts in block diagram form a computer program in accordance with this disclosure.

A block diagram of a suitable computer program (software system) 30 is depicted in FIG. 10, showing various modules for carrying out the above-described method. The names for the various modules are intended only for purposes of identification rather than to be limiting. System 30 includes: a collision detector module 32 which detects a set of intersecting points of the two bodies; a displacement module 34 operatively coupled to the collision detector module and which moves a location of points of the set of intersecting points to remove the intersection; a pump module 36 operatively coupled to the displacement module and which increases a volume of at least one of the bodies to preserve an initial volume of the body by displacing a plurality of points on a surface of the body each by a weighted value that is a combination of user defined weight, distance to collision center, and volume influence; a local smoothing module 40 operatively coupled to the displacement module and which smoothes a location of points in the intersection each by a weighted value; a global smoothing module 42 operatively coupled to the displacement module and which smoothes at least one of the bodies by a low pass filter; and a covering module 46 operatively coupled to the smoothing modules and which provides the skin covering the two bodies.

This disclosure is illustrative but not limiting; further modifications will be apparent to those skilled in the art in light of this disclosure and are intended to fall within the scope of the appended claims.

What is claimed as new and desired to be protected by Letters Patent of the United States is:

1. A method of animation executed by a computer of representing a character including two three-dimensional bodies by a set of points, the bodies having mutually intersecting points, comprising the acts of:

detecting a set of intersecting points of the two bodies defining an interpenetration;

moving a location of at least some points of the set of intersecting points so as to remove the intersection;

increasing a volume of at least one of the bodies to preserve an initial volume of the body by:

prior to moving the locations of the intersecting points, computing the initial volume of the body by multiplying, for a plurality of polygons enclosing the body, the area of each polygon times the distance from the polygon area to the center of the body and summing the results;

computing the volume of the body, after the locations of the intersecting points are moved, by multiplying, for the plurality of polygons enclosing the body, the area of each polygon times the distance from the polygon area to the center of the body and summing the results;

for each of a plurality of points on the surface of the body displacing the point on the surface of the body by a weighted value;

smoothing a location of the intersecting points; and repeating the acts of detecting, moving, increasing and smoothing for each of a plurality of animation key frames.

2. The method of claim 1, further comprising the act of providing a skin covering the two bodies.

3. The method of claim 1, wherein one of the bodies is designated as a master and the other a slave.

4. The method of claim 3, wherein the volume of the master body is increased in the act of increasing a volume.

5. The method of claim 3, wherein the master body has greater volume than does the slave body.

6. The method of claim 3, wherein the master body is a torso and the slave body is a limb or head or tail of the character.

7. The method of claim 1, wherein the weighted value is a function of a sum of displacements of neighboring points.

8. The method of claim 1, wherein the smoothing extends over a plurality of neighboring points.

9. The method of claim 1, wherein the smoothing includes applying a low pass filter.

10. The method of claim 1, wherein the act of increasing a volume of the body includes moving only those points not displaced by the act of moving points of the set to remove the intersection.

11. The method of claim 1, wherein the act of increasing a volume of the body includes moving each point in a direction normal to a surface of the body at the point.

12. The method of claim 11, wherein the direction is further defined by an axis of an intersection of the two bodies at each point.

13. The method of claim 1, wherein the weighted value is used to preserve a volume of at least one of the bodies.

14. The method of claim 1, wherein the act of increasing a volume includes:

computing the weighted value for each point as a function of a user selected value.

15. The method of claim 1, wherein the weighted value is a function of a normalized distance from each point to a center of the intersecting points and a normalized weighted area of a plurality of the polygons for each point.

16. The method of claim 1, wherein the weighted value for each point is proportional to a user selected value and a normalized weighted area, and inversely proportional to a weighted distance.

17. The method of claim 1, wherein the method is carried out pursuant to instructions from program software being executed by the computer.

18. A computer system for key frame animation by representing a character including two three-dimensional bodies by a set of points, the bodies initially having mutually intersecting points, the system comprising: a processor executing software modules comprising: a collision detector module which detects a set of intersecting points of the two bodies defining an interpenetration;

a displacement module operatively coupled to the collision detector module and which moves a location of points of the set of intersecting points to remove the intersection;

a pump module operatively coupled to the displacement module and which increases a volume of at least one of the bodies to preserve an initial volume of the body by:

prior to moving the locations of the intersecting points, computing the initial volume of the body by multiplying, for a plurality of polygons enclosing the body, the area of each polygon times the distance from the polygon area to the center of the body and summing the results;

computing the volume of the body after the locations of the intersecting points are moved, by multiplying, for a plurality of polygons for the plurality of polygons enclosing the body, the area of each polygon times the distance from the polygon area to the center of the body and summing the results, for each of a plurality of points on the surface of the body displacing the point on the surface of the body by a weighted value; and a local smoothing module operatively coupled to the displacement module and which smoothes a location of the intersecting points.

19. The system of claim 18, further comprising a global smoothing module operatively coupled to the displacement module and which smoothes at least one of the bodies by a low pass filter.

20. The system of claim 18, further comprising a module operatively coupled to the smoothing modules and which provides a skin covering the two bodies.

21. The system of claim 18, wherein one of the bodies is designated as a master and the other a slave.

22. The system of claim 21, wherein the volume of the master body is increased in the act of increasing a volume.

23. The system of claim 21, wherein the master body has greater volume than the slave body.

24. The system of claim 21, wherein the master body is a torso and the slave body is a limb or head or tail of the character.

25. The system of claim 18, wherein the weighted value is a function of a sum of displacements of neighboring points.

26. The system of claim 18, wherein the smoothing extends over a plurality of neighboring points.

27. The system of claim 18, wherein the smoothing includes applying a low pass filter.

28. The system of claim 18, wherein the increasing a volume of the body includes moving only those points not displaced by the act of moving points of the set to remove the intersecting points.

29. The system of claim 18, wherein the increasing a volume of the body includes moving each point in a direction normal to a surface of the body at the point.

30. The system of claim 29, wherein the direction is further defined by an axis of an intersection of the two bodies at each point.

31. The system of claim 18, wherein the user defined weight is such as to preserve a volume of at least one of the bodies.

32. The system of claim 18, wherein the increasing a volume includes:

computing the weighted value for each point as function of a user defined weight.

33. The system of claim 32, wherein the weighted value is also a function of a normalized distance from each point to a center of the intersecting points and a normalized weighted area of a plurality of the polygons for each point.

34. The system of claim 33, wherein the weighted value for each point is proportional to a user selected value and a normalized weighted area, and inversely proportional to a weighted distance.

* * * * *